United States Patent
Kim et al.

(10) Patent No.: US 10,782,806 B2
(45) Date of Patent: Sep. 22, 2020

(54) TOUCH DISPLAY DEVICE AND METHOD FOR DRIVING THEREOF

(71) Applicant: LG Display Co., Ltd., Seoul (KR)

(72) Inventors: Jaeseung Kim, Paju-si (KR); JiHyun Jung, Paju-si (KR); DeukSu Lee, Paju-si (KR); Sangkyu Kim, Paju-si (KR); JaeGyun Lee, Paju-si (KR); Taeyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 240 days.

(21) Appl. No.: 15/813,098

(22) Filed: Nov. 14, 2017

(65) Prior Publication Data

US 2018/0348931 A1    Dec. 6, 2018

(30) Foreign Application Priority Data

Jun. 2, 2017   (KR) .................. 10-2017-0068835

(51) Int. Cl.
*G06F 3/041* (2006.01)
*G06F 3/044* (2006.01)
*G09G 3/3225* (2016.01)

(52) U.S. Cl.
CPC ............ *G06F 3/0412* (2013.01); *G06F 3/044* (2013.01); *G06F 3/0416* (2013.01); *G06F 3/0418* (2013.01); *G09G 3/3225* (2013.01); *G06F 2203/04104* (2013.01)

(58) Field of Classification Search
CPC ...... G06F 3/0412; G06F 3/0416; G06F 3/044; G06F 2203/04104; G06F 3/0418; G09G 3/3225

See application file for complete search history.

(56) References Cited

U.S. PATENT DOCUMENTS

| | | | |
|---|---|---|---|
| 8,913,017 | B2 | 12/2014 | Chang et al. |
| 10,025,970 | B2 | 7/2018 | Mizuhashi et al. |
| 10,146,987 | B2 | 12/2018 | Mizuhashi et al. |
| 2011/0234523 | A1 | 9/2011 | Chang et al. |

(Continued)

FOREIGN PATENT DOCUMENTS

| | | |
|---|---|---|
| CN | 104571734 A | 4/2015 |
| CN | 104615314 A | 5/2015 |

(Continued)

OTHER PUBLICATIONS

Extended European Search Report, European Patent Application No. 17211076.9, dated Jun. 6, 2018, 11 pages.

(Continued)

*Primary Examiner* — Mark W Regn
(74) *Attorney, Agent, or Firm* — Fenwick & West LLP

(57) ABSTRACT

The present exemplary embodiments relate to a touch display device and a driving method thereof. A touch sensing time period is divided into a period when the touch is sensed by a self capacitive sensing manner and a period when the touch is sensed by a mutual capacitive sensing manner and a ground signal modulated to be the same as the touch driving signal is output to the display panel during the time period when the touch is sensed by the self capacitive sensing manner. By doing this, the parasitic capacitance in the display panel is reduced, sensitivity of touch sensing is improved, and various touch functions are provided.

12 Claims, 18 Drawing Sheets

(56) References Cited

U.S. PATENT DOCUMENTS

| | | |
|---|---|---|
| 2012/0169660 A1 | 7/2012 | Seo |
| 2014/0145979 A1* | 5/2014 | Lee .................. G06F 3/0412 |
| | | 345/173 |
| 2015/0035791 A1* | 2/2015 | Mo .................. G09G 3/3648 |
| | | 345/174 |
| 2016/0188035 A1 | 6/2016 | Chiou et al. |
| 2016/0266676 A1* | 9/2016 | Wang .................. G06F 3/044 |
| 2017/0017336 A1 | 1/2017 | Mayumi |
| 2017/0031507 A1* | 2/2017 | Huang .................. G06F 3/044 |
| 2017/0046004 A1* | 2/2017 | Choi .................. G06F 3/0418 |
| 2017/0103247 A1 | 4/2017 | Mizuhashi et al. |
| 2018/0293421 A1 | 10/2018 | Mizuhashi et al. |
| 2019/0065807 A1 | 2/2019 | Mizuhashi et al. |

FOREIGN PATENT DOCUMENTS

| | | |
|---|---|---|
| CN | 106033290 A | 10/2016 |
| EP | 3040827 A1 | 7/2016 |
| EP | 3073481 A1 | 9/2016 |
| JP | 2017-073054 | 4/2017 |
| TW | I434207 B | 4/2014 |
| WO | WO 2015-088629 A1 | 6/2015 |
| WO | WO 2015/166687 | 11/2015 |

OTHER PUBLICATIONS

Japanese Office Action with concise explanation of relevance, Japanese Patent Application No. 2017-248961, dated Feb. 5, 2019, 8 pages.

First Office Action, Taiwanese Patent Application No. 106146573, dated Nov. 28, 2018, 6 pages.

\* cited by examiner

Tx Self-Sensing

TOUCH DISPLAY DEVICE AND METHOD FOR DRIVING THEREOF

CROSS-REFERENCE TO RELATED APPLICATIONS

This application claims priority from Republic of Korea Patent Application No. 10-2017-0068835, filed on Jun. 2, 2017, which is hereby incorporated by reference in its entirety.

BACKGROUND

Field of Technology

The present exemplary embodiments relate to a touch display device and a method for driving a touch display device.

Description of the Related Art

With progress of the information-oriented society, various types of demands for display devices which display an image are increasing. Further, various types of display devices such as a liquid crystal display device, a plasma display device, and an organic light emitting display device have been used.

Such a display device provides a function of recognizing touch of the user on a display panel and performing an input processing based on the recognized touch to provide various functions to the user.

As a method of recognizing a user's touch by a display device, there is a method of recognizing the user's touch by disposing a plurality of touch sensors on a display panel and sensing change in a capacitance caused by the user's touch on the display panel.

Further, a method for sensing touch on the display panel based on a change in capacitance includes a self capacitive sensing manner and mutual capacitive sensing manner.

The self capacitive sensing manner is a method of sensing touch of the user by receiving a touch sensing signal from a touch sensor to which a touch driving signal is applied. The mutual capacitive sensing manner is a method of configuring the touch sensor by a driving (Tx) electrode to which a touch driving signal is applied and a sensing (Rx) electrode for receiving a touch sensing signal and sensing touch of the user.

Among the touch sensing methods, according to the self capacitive sensing manner, it is difficult to sense multi touch of the user. Further, according to the mutual capacitive sensing manner, the sensitivity of the touch sensing is lowered.

Further, when the touch is sensed based on the change of the capacitance, there is a problem in that the user's touch may not be precisely sensed due to a parasitic capacitance in the display panel.

SUMMARY

An object of the present exemplary embodiments is to provide a touch display device which improves sensitivity of touch sensing in a capacitive-based touch display device and provides various touch recognizing functions such as multi touch.

Another object of the present exemplary embodiments is to provide a touch display device which improves sensitivity and precision of the touch sensing by reducing influence due to the parasitic capacitance in the display panel when the touch sensing is performed in the touch display device.

According to an aspect of the present exemplary embodiments, there is provided a touch display device including a first plurality of touch sensors disposed on a display panel along a first direction; a plurality of first touch lines connected to the first plurality of touch sensors; a second plurality of touch sensors disposed on the display panel along a second direction that intersects the first direction; a plurality of second touch lines that are connected to the second plurality of touch sensors; and a driving circuit that outputs a touch driving signal for sensing touch on the touch display device to at least one of either the first plurality of touch sensors via one of the plurality of first touch lines or one of the second plurality of touch sensors via one of the plurality of second touch lines, and receives a touch sensing signal through at least the one of the plurality of first touch lines or the one of the plurality of second touch lines during a touch sensing time period, and outputs a ground signal to the display panel while the touch driving signal is simultaneously output to at least one of either the first plurality of touch sensors or one of the second plurality of touch sensors, the ground signal modulated to be the same as the touch driving signal.

According to another aspect of the present exemplary embodiments, there is provided a driving method of a touch display device including outputting a touch driving signal to at least one touch line of a first touch line and a second touch line disposed on a display panel during a touch sensing time period for sensing touch on the touch display device; outputting a ground signal to the display panel simultaneously with the touch driving signal during the touch sensing time period, the ground signal modulated to be the same as the touch driving signal; receiving a touch sensing signal through at least one touch line among the first touch line and the second touch line; and sensing touch on the display panel based on the received touch sensing signal.

According to an aspect of the present exemplary embodiments, there is provided a touch display device including a first plurality of touch sensors disposed on a display panel along a first direction; a plurality of first touch lines connected to the first plurality of touch sensors; a second plurality of touch sensors disposed on the display panel along a second direction that intersects the first direction; a plurality of second touch lines,the plurality of second touch lines connected to the second plurality of touch sensors; and a driving circuit that outputs the touch driving signal to a first touch line of the plurality of first touch lines and a second touch line of the plruality of second touch lines during a first touch sensing time period and receives the touch sensing signal through the first touch line and the second touch line during the first touch sensing time period, and outputs the touch driving signal to the first touch line during a second touch sensing time period and receives the touch sensing signal through the second touch line during the second touch sensing time period, and wherein the driving circuit outputs a display driving signal for display an image to the display panel during the second touch sensing time period, but does not output the display driving signal during the first touch sensing time period.

According to an aspect of the present exemplary embodiments, there is provided a touch display device comprising a first plurality of touch sensors disposed on a display panel along a first direction; a plurality of first touch lines connected to the first plurality of touch sensors; a second plurality of touch sensors disposed on the display panel along a second direction that intersects the first direction; a plurality of second touch lines, the plurality of second touch lines connected to the second plurality of touch sensors; and a driving circuit that outputs the touch driving signal to a first touch line of the plurality of first touch lines and a second touch line of the plurality of second touch lines during a first touch sensing time period, and receives the touch sensing signal through the first touch line and the second touch line during the first touch sensing time period, and outputs the touch driving signal to the first touch line during a second touch sensing time period and receives the touch sensing signal through the second touch line during the second touch sensing time period, and the driving circuit outputting a ground signal to a ground line of the display panel, the ground signal modulated to be of a substantially same phase and magnitude as the touch driving signal during the first touch sensing time period.

According to an aspect of the present exemplary embodiments, there is provided a touch display device comprising a first plurality of touch sensors disposed on a display panel along a first direction; a plurality of first touch lines connected to the first plurality of touch sensors; a second plurality of touch sensors disposed on the display panel along a second direction that intersects the first direction; a plurality of second touch lines, the plurality of second touch lines connected to the second plurality of touch sensors; and a driving circuit that outputs a touch driving signal for sensing touch via either self-capactive touch sensing or mutual capacive touch sensing during a plurality of touch sensing periods in a single display frame, the touch driving signal output to at least one of the first plurality of touch sensors and the second plurality of touch sensors.

According to the present exemplary embodiments, both self capacitive sensing manner and mutual capacitive sensing manner are operated in parallel to sense the user's touch on the display panel, thereby improving sensitivity of touch sensing on the display panel and providing various touch sensing functions.

According to the present exemplary embodiments, provided is a touch display device in which a parasitic capacitance in the display panel is reduced during a time period when the touch on the display panel is sensed, thereby improving the sensitivity and precision of the touch sensing on the display panel.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
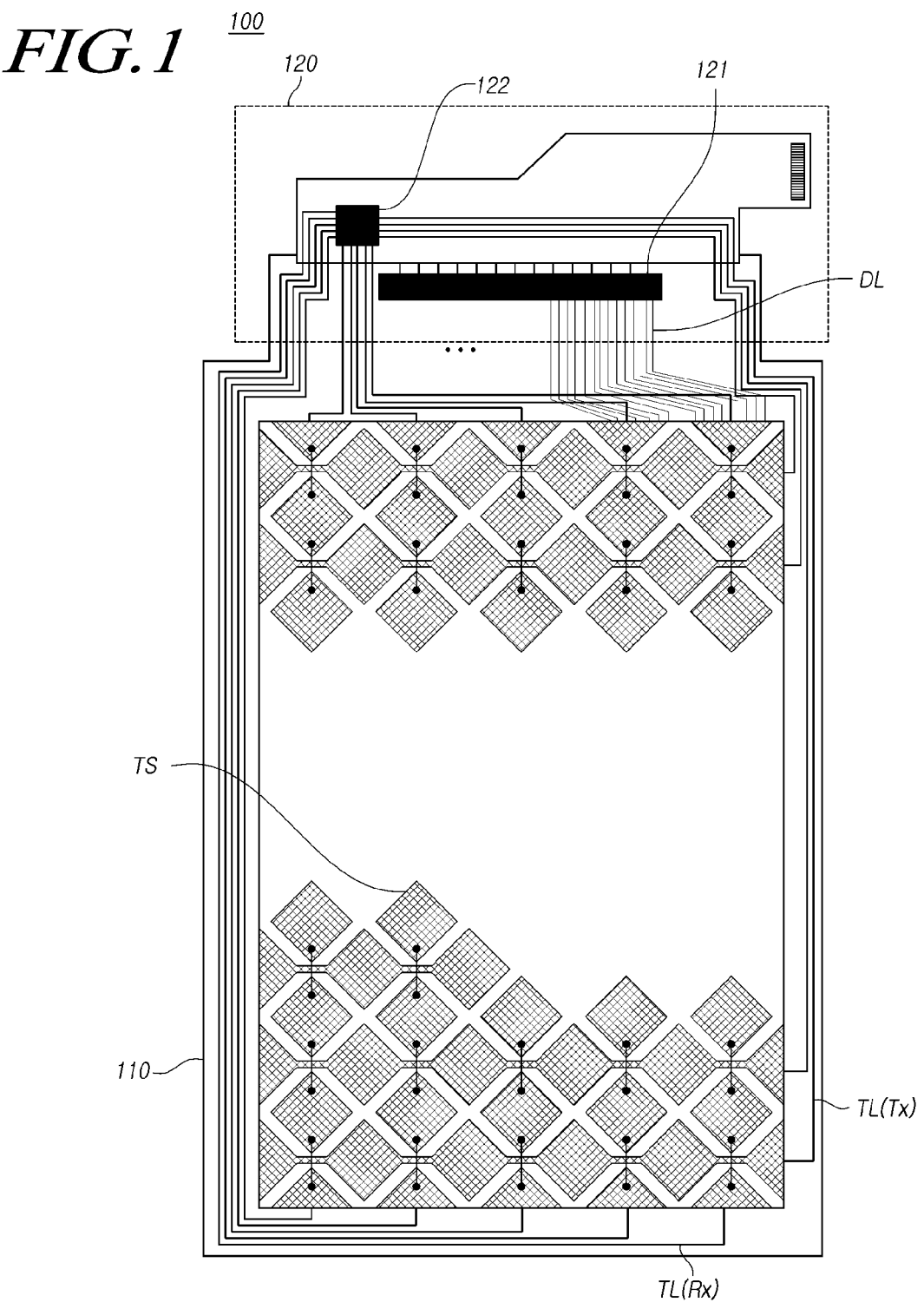
FIG. 1 is a plan view illustrating a schematic configuration of a touch display device according to the present exemplary embodiments.

Hereinafter, some embodiments of the present disclosure will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Further, in describing components of the present disclosure, terminologies such as first, second, A, B, (a), (b), and the like may be used. The terminologies are used to distinguish one component from another component. However, a nature, an order, a sequence, or the number of components is not limited by the terminologies. If it is described that a component is "connected" or "coupled" to another component, it is understood that the component is directly connected or coupled to the other component but a component may be interposed between the components or the components may be "connected" or "coupled" through another component.

FIG. 1 illustrates a schematic configuration of a touch display device 100 according to the present exemplary embodiments.

Referring to FIG. 1, the touch display device 100 according to the present exemplary embodiment includes a touch display panel 110 on which a plurality of touch sensors TS and a plurality of touch lines TL are disposed and a driving circuit 120 which drives the touch sensor TS disposed on the display panel 110 and performs touch sensing.

The plurality of touch sensors TS is configured by a driving (Tx) electrode to which a touch driving signal is applied and a sensing (Rx) electrode for receiving a touch sensing signal. The plurality of touch sensors is separately disposed on the display panel 110 to have a predetermined size.

Here, when the touch display device 100 performs the touch sensing by the self capacitive sensing manner, both the Tx electrode and the Rx electrode may be electrodes to which the touch driving signal is applied.

The plurality of touch lines TL is configured by a first touch line TL(Tx) which is connected to the Tx electrode and is applied with the touch driving signal and a second touch line TL(Rx) which is connected to the Rx electrode and transmits a touch sensing signal.

For example, the first touch line TL(Tx) is connected with the touch sensor TS disposed on the display panel 110 in a horizontal direction and the second touch line TL(Rx) is connected with the touch sensor TS disposed on the display panel 110 in a vertical direction, but the exemplary embodiments are not limited thereto.

The driving circuit 120 may include a data driving circuit 121 which outputs a signal for display driving of the display panel 110 and a touch driving circuit 122 which performs the touch sensing using the touch sensor TS.

The data driving circuit 121 outputs a data voltage according to a gray scale of image data in accordance with a timing at which a scan signal is applied to each sub pixel disposed on the display panel 110 to display the image on the display panel 110.

The touch driving circuit 122 applies a touch driving signal to the touch sensor TS through the touch line TL disposed on the display panel 110 and receives the touch sensing signal to sense touch on the display panel 110.

When the touch on the display panel 110 is sensed by a self capacitive sensing manner, the touch driving circuit 122 outputs the touch driving signal to the first touch line TL(Tx) and the second touch line TL(Rx) disposed on the display panel 110 and receives the touch sensing signal to perform touch sensing through the first touch line TL(Tx) and the second touch line TL(Rx).

Here, the touch sensing to a Tx electrode and the touch sensing to a Rx electrode may be sequentially performed or simultaneously performed.

When the touch is sensed by a mutual capacitive sensing manner, the touch driving circuit 122 outputs the touch driving signal through the first touch line TL(Tx) and receives the touch sensing signal through the second touch line TL(Rx) to sense the touch on the display panel 110.

The above-described touch display device 100 may be a liquid crystal display device or an organic light emitting display device.

When the touch display device 100 is a liquid crystal display device, a common electrode which is disposed on the display panel 110 for display driving may be utilized as a touch sensor TS. When the touch display device 100 is an organic light emitting display device, the touch sensor TS is disposed on an encapsulation layer in the display panel 110 to perform touch sensing.

Figure 2:
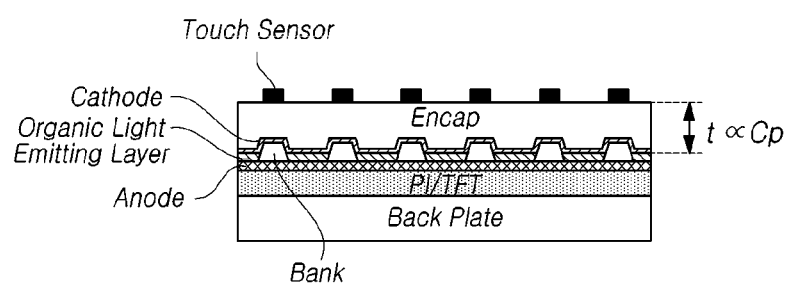
FIGS. 2 to 4 are cross-sectional views illustrating an example of a cross-sectional structure of a touch display device according to the present exemplary embodiments.
Figure 3:
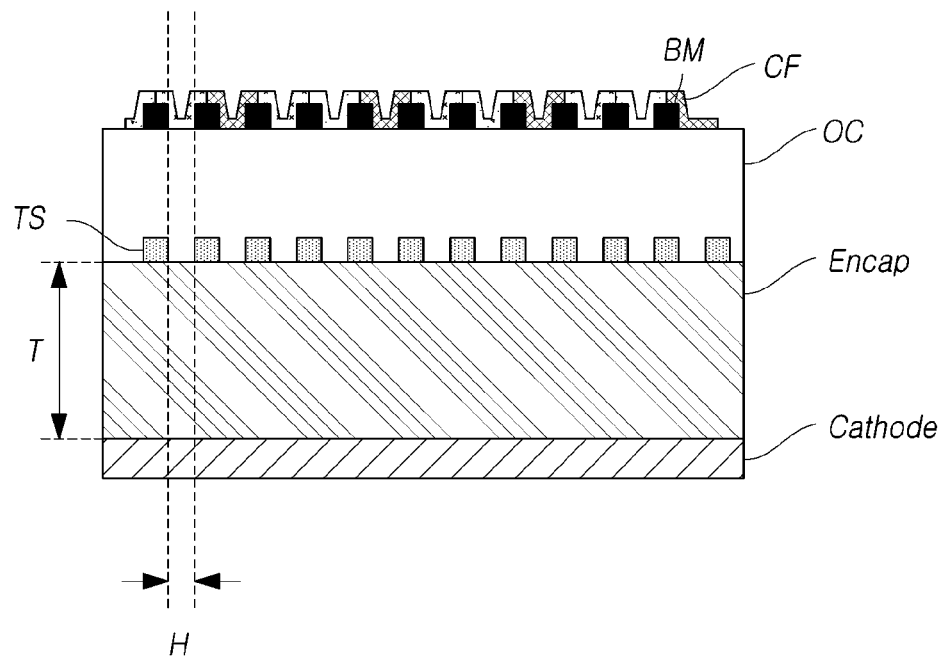
Figure 4:
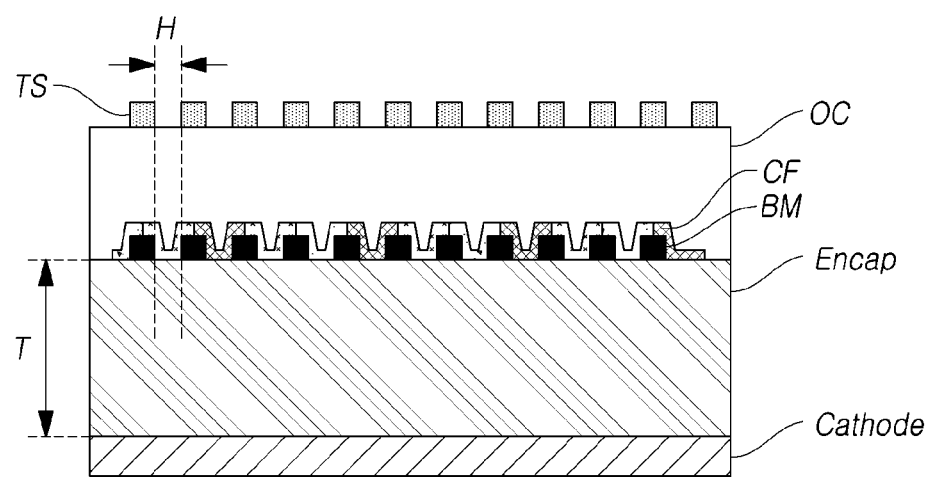

FIGS. 2 to 4 illustrate an example of a cross-section of a touch display device 100 when the touch display device 100 according to the present exemplary embodiments is an organic light emitting display device.

Referring to FIG. 2, in the touch display device 100 according to the present exemplary embodiments, a thin film transistor (TFT) layer on which polyimide and a thin film transistor for display driving are formed is disposed on a substrate or a back plate.

An anode is formed in a light emitting position of each sub pixel on the TFT layer, an organic light emitting layer and a bank are disposed on the anode, and a commonly formed cathode is disposed in the sub pixel area.

The encapsulation layer Encap may be disposed on the cathode and a plurality of touch sensors TS may be disposed on the encapsulation layer Encap.

Here, the touch sensor TS may be formed of metal disposed on the encapsulation layer Encap. In this case, the touch sensor TS and the display panel 110 may be integrally configured.

Alternatively, the touch sensor TS may be a film touch sensor which is adhered onto the encapsulation layer Encap by means of an adhesive film OCA. That is, a separate film touch sensor may be adhered on the display panel 110 to configure the touch sensor TS.

Therefore, various methods for disposing the touch sensor TS on the encapsulation layer Encap may be selected in accordance with a process advantage and in addition to the above-described examples, all structures in which the touch sensor TS is located on the encapsulation layer Encap may be included in the scope of the present exemplary embodiments.

An example of a specific structure in which the touch sensor TS is disposed on the encapsulation layer Encap will be described with reference to FIGS. 3 and 4.

Referring to FIGS. 3 and 4, the touch sensor TS may be disposed between the encapsulation layer Encap and a cover of the display panel 110. That is, a configuration for touch sensing such as a touch sensor TS and a touch line TL may be disposed on the encapsulation layer Encap.

Here, a thickness T of the encapsulation layer Encap may be 5 μm or larger.

As described above, the thickness T of the encapsulation layer Encap is designed to be equal to or larger than a predetermined thickness so that a parasitic capacitance formed between the cathode of the organic light emitting diode OLED and the touch sensor TS may be reduced. Accordingly, the lowering of sensitivity of touch sensing due to the parasitic capacitance may be suppressed.

In the meantime, when the touch sensor TS is a mesh type touch sensor including a hole H, the hole H included in the touch sensor TS may be located to correspond to a light emitting unit of the sub pixel.

Therefore, the hole of the touch sensor TS may correspond to a color filter CF. For example, when a white organic light emitting diode OLED is used so that a color filter CF is required, a touch display device 100 having excellent light emission performance may be provided by associating a position of the color filter CF with the position of the hole H of the touch sensor TS.

A vertical position of the touch sensor TS and the color filter CF may be designed in various forms.

For example, as illustrated in FIG. 3, the color filter CF and a black matrix BM may be disposed on the touch sensor TS. Further, the color filter CF and the black matrix BM may be disposed on an overcoat layer OC disposed on the touch sensor TS.

As another example, as illustrated in FIG. 4, the color filter CF and the black matrix BM may be disposed below the touch sensor TS. In this case, the touch sensor TS may be disposed on the overcoat layer OC disposed on the color filter FC and the black matrix BM.

That is, the touch sensor TS and the color filter CF may be designed to have an optimal position relationship in consideration of a touch performance and a display performance.

Further, a structure in which the touch sensor TS is disposed on the encapsulation layer Encap is provided so that it is possible to overcome a problem in that it is difficult to form a touch sensor TS which is generally a metal material in the panel due to an organic material and to provide an organic light emitting display device having excellent display performance and touch performance.

Such a touch sensor TS may be driven in self capacitive sensing manner or mutual capacitive sensing manner.

Figure 5:
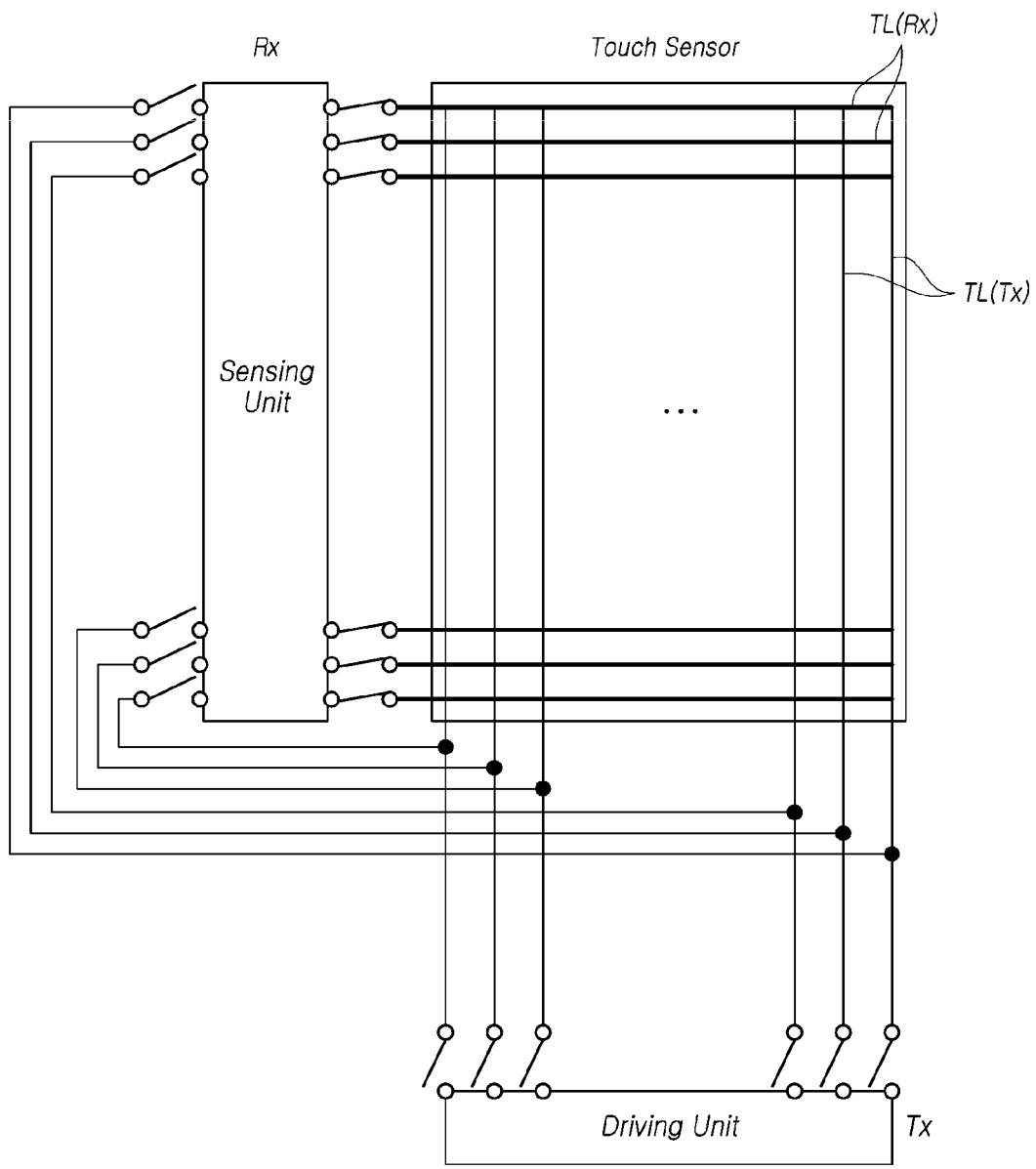
FIGS. 5 and 6 are views for explaining a manner in which a touch display device according to the present exemplary embodiments operates in a self capacitive sensing manner.
Figure 6:
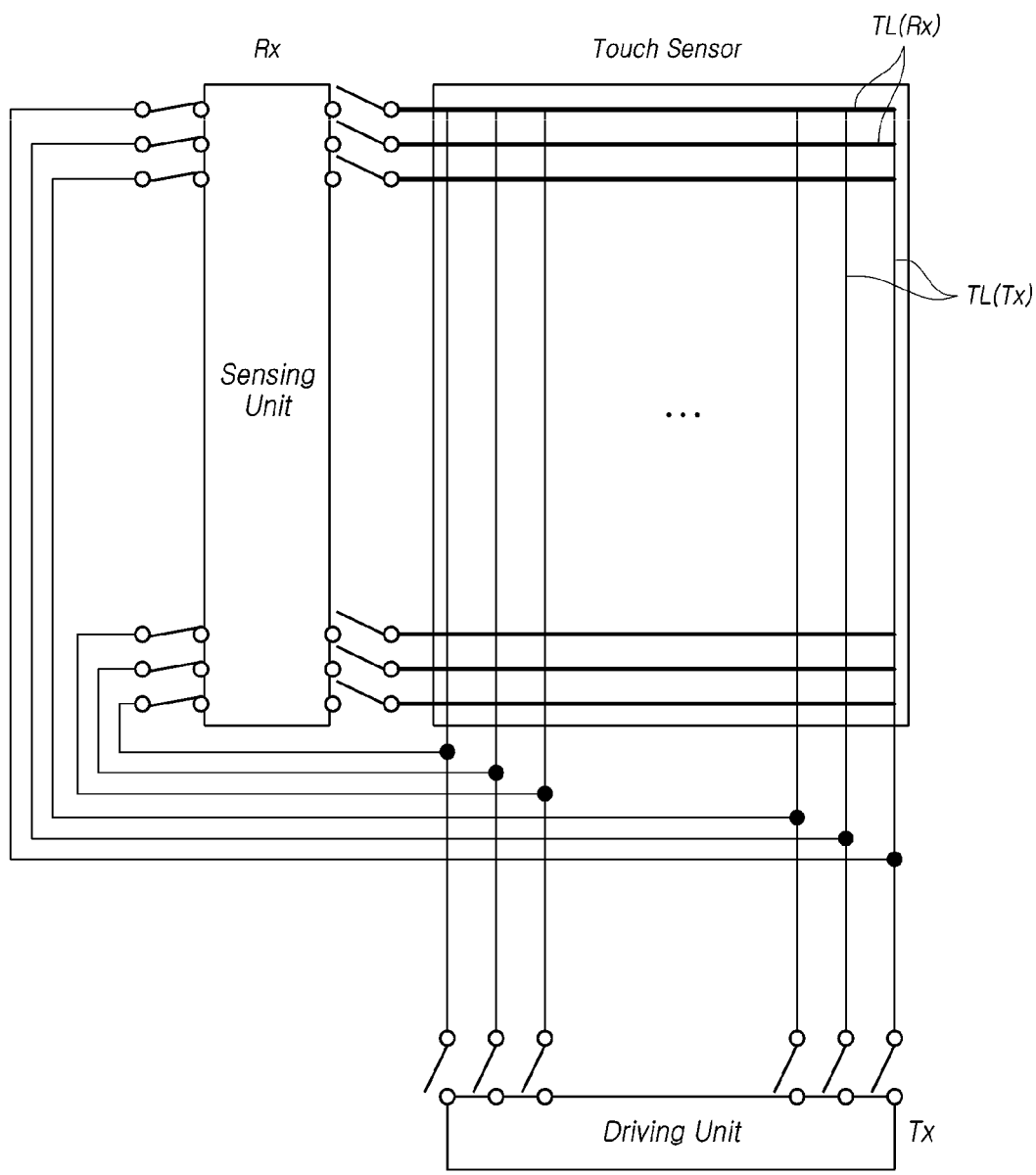

FIGS. 5 and 6 illustrate an example that the touch display device 100 according to the present exemplary embodiments performs the touch sensing in a self capacitive sensing manner and the touch sensing is performed using a Rx electrode and a Tx electrode.

Referring to FIGS. 5 and 6, in the touch display device 100 according to the present exemplary embodiment, a plurality of touch sensors TS configured by the Tx electrode and the Rx electrode is disposed in the touch display panel 110.

Further, the touch driving circuit 122 may be configured by a driving unit which outputs a touch driving signal and a sensing unit which receives a touch sensing signal.

The Tx electrode among the plurality of touch sensors TS disposed in the display panel 110 is connected to the driving unit and the sensing unit of the touch driving circuit 122 through the first touch line TL(Tx) and the Rx electrode is connected to the sensing unit of the touch driving circuit 122 through the second touch line TL(Rx).

During a time period when the touch display device 100 according to the present exemplary embodiments performs touch sensing in the self capacitive sensing manner, as illustrated in FIG. 5, a switch between the second touch line TL(Rx) connected to the Rx electrode and the sensing unit is turned on so that the sensing unit receives the touch sensing signal from the Rx electrode.

Further, as illustrated in FIG. 6, a switch between the first touch line TL(Tx) connected to the Tx electrode and the sensing unit is turned on so that the sensing unit receives the touch sensing signal from the Tx electrode.

The touch driving circuit 122 senses change in the capacitance using the touch sensing signal received through the first touch line TL(Tx) or the touch sensing signal received through the second touch line TL(Rx) and senses the touch on the display panel 110.

Figure 7:
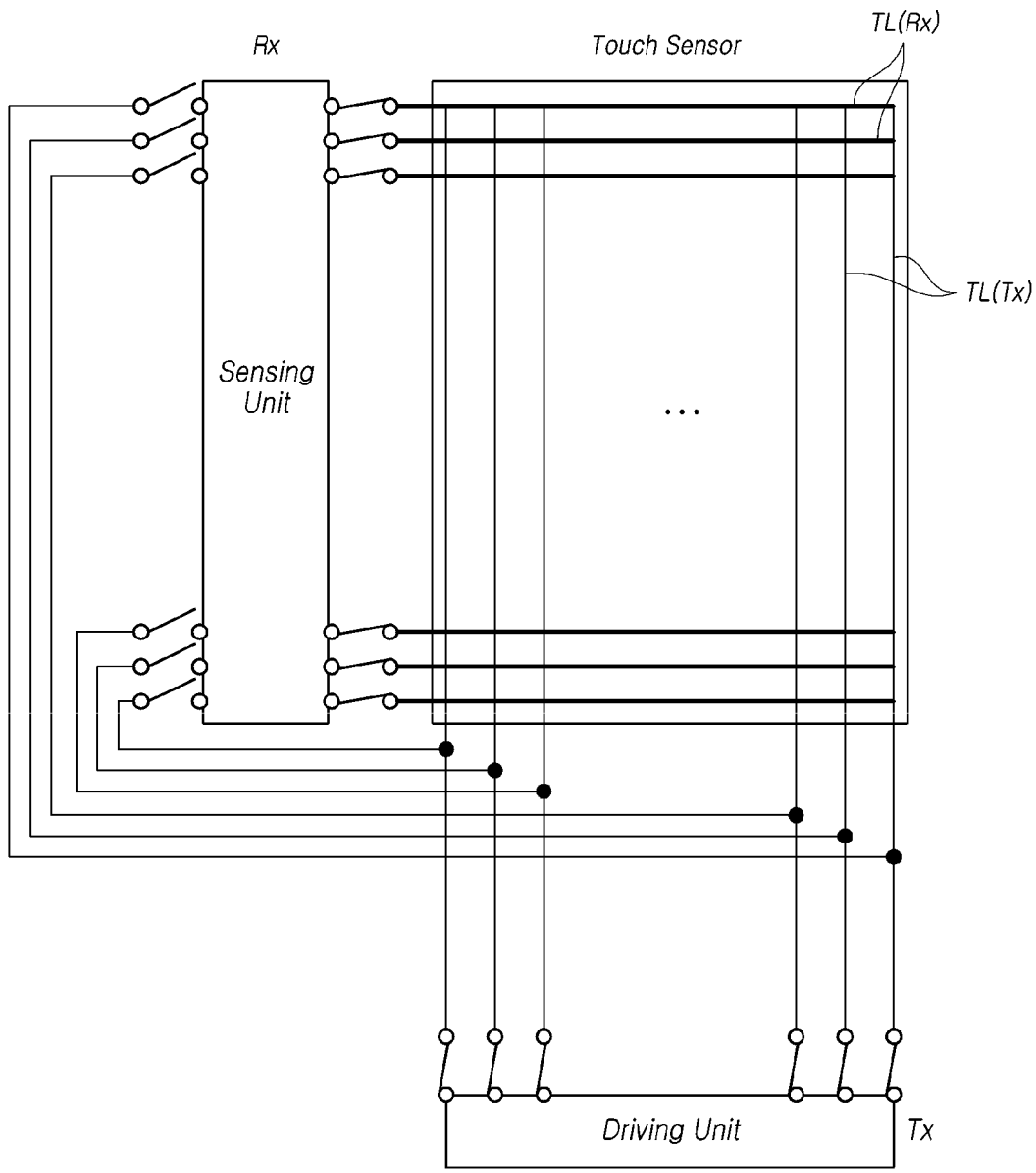
FIG. 7 is a view for explaining a method in which a touch display device according to the present exemplary embodiments operates by a mutual capacitance sensing manner.

FIG. 7 illustrates an example that the touch display device 100 according to the present exemplary embodiments senses the touch in a mutual capacitive sensing manner.

Referring to FIG. 7, during a time period when the touch display device 100 according to the present exemplary embodiments performs the touch sensing in a mutual capacitive sensing manner, a switch between the first touch line TL(Tx) connected to the Tx electrode and the driving unit is turned on so that the touch driving signal is applied to the Tx electrode.

Further, a switch between the second touch line TL(Rx) connected to the Rx electrode and the sensing unit is turned on so that the sensing unit receives the touch sensing signal from the Rx electrode.

The touch driving circuit 122 senses the touch on the display panel 110 based on the touch sensing signal received through the second touch line TL(Rx).

Accordingly, according to the present exemplary embodiments, operation of the switches disposed between the touch lines TL connected to the touch sensor TS and the touch driving circuit 122 are controlled to sense the user's touch on the display panel 110 in a self capacitive sensing manner or a mutual capacitive sensing manner.

The touch sensing by a self capacitive sensing manner and the touch sensing by a mutual capacitive sensing manner may be performed by time-dividing the touch sensing time period.

Figure 8:
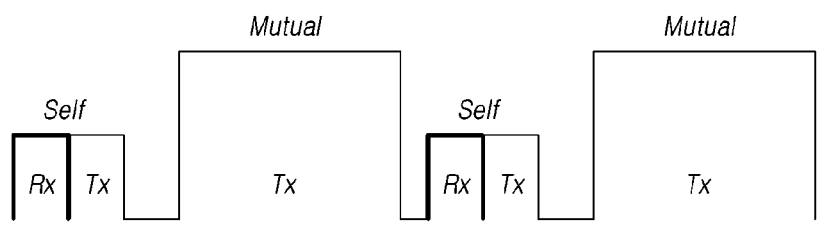
FIGS. 8 and 9 are views illustrating a timing of a touch driving signal applied at the time of touch sensing of a touch display device according to the present exemplary embodiments.
Figure 9:
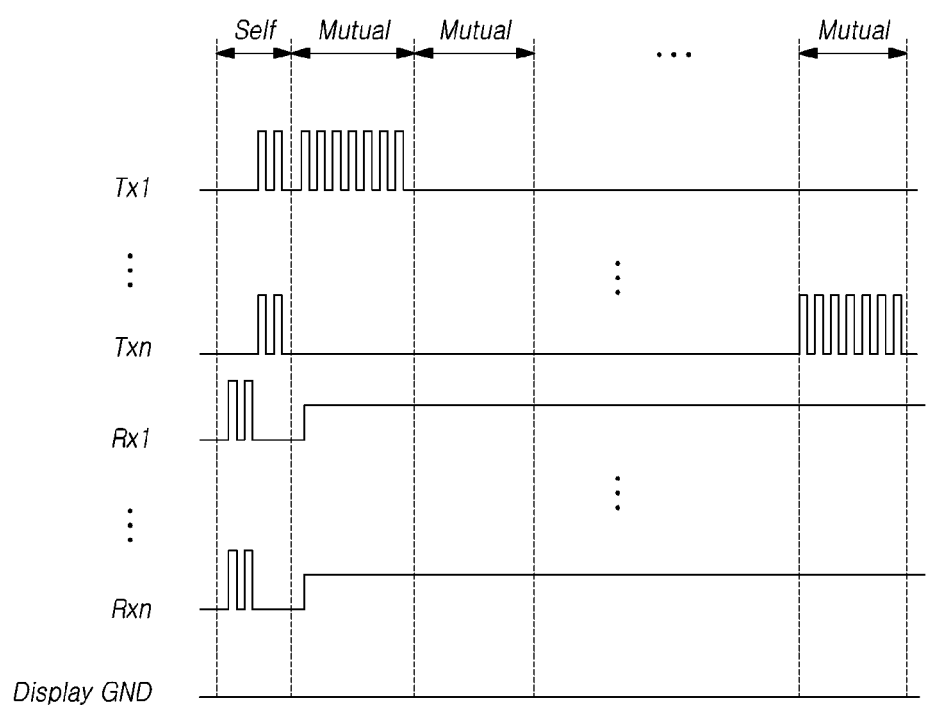

FIGS. 8 and 9 illustrate an example of a timing when the touch display device 100 according to the present exemplary embodiments performs the touch sensing in a self capacitive sensing manner and a mutual capacitive sensing manner.

Referring to FIG. 8, the touch display device 100 according to the present exemplary embodiments applies the touch driving signal to the Rx electrode, applies the touch driving signal to the Tx electrode, and performs the touch sensing based on the touch sensing signal received from the Rx electrode and the Tx electrode during a first touch sensing time period.

The touch display device 100 applies the touch driving signal to the Tx electrode and receives the touch sensing signal from the Rx electrode to sense the touch on the display panel 110 during a second touch sensing time period.

Therefore, the sensitivity of the touch sensing is improved by sensing the touch in the self capacitive sensing manner during the first touch sensing time period and various functions such as multi-touch sensing may be provided by sensing the touch in the mutual capacitive sensing manner during the second touch sensing time period.

FIG. 9 more specifically illustrates a signal which is applied to a touch sensor TS when the touch display device 100 according to the present exemplary embodiments perform the touch sensing using both the self capacitive sensing manner and the mutual capacitive sensing manner in parallel.

Referring to FIG. 9, the touch display device 100 according to the present exemplary embodiments outputs the touch driving signal to the Tx electrode and the Rx electrode and receives the touch sensing signal from the Tx electrode and the Rx electrode during the first touch sensing time period when the touch sensing is performed in the self capacitive sensing manner.

Further, the touch display device 100 outputs the touch driving signal to the Tx electrode and receives the touch sensing signal from the Rx electrode during the second touch sensing time period when the touch sensing is performed in the mutual capacitive sensing manner.

The driving circuit 120 of the touch display device 100 senses the touch on the display panel 110 based on the touch sensing signal received during the first touch sensing time period and the second touch sensing time period.

In this case, a parasitic capacitance may be generated in the display panel 110 and the parasitic capacitance may affect the capacitive-based touch sensing. Specifically, when the touch sensing is performed in the self capacitive sensing manner, whether the touch sensing is available may be determined by the magnitude of the parasitic capacitance.

Figure 10:
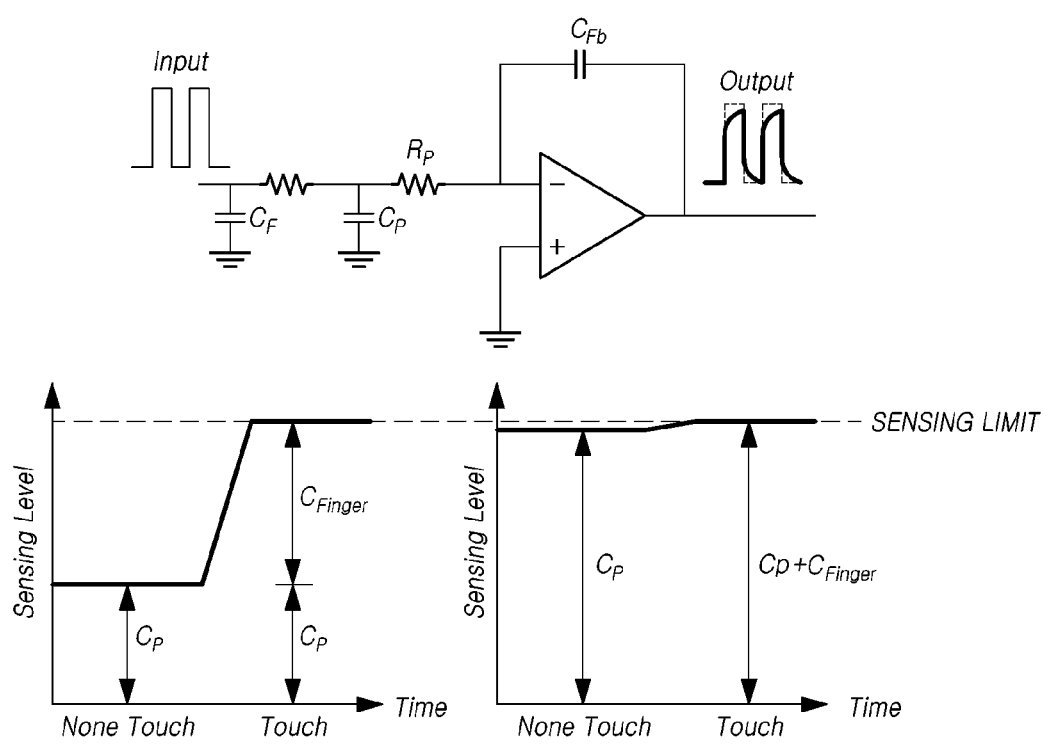
FIG. 10 illustrates an example of influence by a parasitic capacitance when the touch display device according to the present exemplary embodiments performs touch sensing by a self capacitive sensing manner.

FIG. 10 illustrates an example that when the touch display device 100 according to the present exemplary embodiments performs the touch sensing in the self capacitive sensing manner, the parasitic capacitance affects the touch sensing. As shown in FIG. 10, the display device 100 includes an op-amp that receives a touch driving signal through the negative (−) terminal and a ground signal through the positive terminal (+). A feedback capacitor $C_{FB}$ is connected between the negative terminal of the op-amp and the output of the op-amp. The feedback capacitor $C_{FB}$ accumulates parasitic capacitance $C_p$ and touch capacitance $C_F$. A resistance $R_p$ connected to the negative terminal of the op-amp represents the parasitic resistance between the touch sensor and the touch driving circuit.

Referring to FIG. 10, when the magnitude of the parasitic capacitance $C_p$ is small, the magnitude of the capacitance $C_F$ which is changed by the touch when the touch on the display panel 110 is generated is large, so that the user's touch may be sensed based on the capacitance $C_F$.

However, when the magnitude of the parasitic capacitance $C_p$ is large, since the magnitude of the capacitance $C_F$ which is changed by the touch when the touch is generated is small due to a sensing limitation, so that the touch sensing based on the capacitance $C_F$ may not be performed.

The touch display device 100 according to the present exemplary embodiments provides a method which may reduce the parasitic capacitance in the display panel 110 and perform the touch sensing when the touch sensing is performed using both the self capacitive sensing manner and the mutual capacitive sensing manner in parallel.

Figure 11:
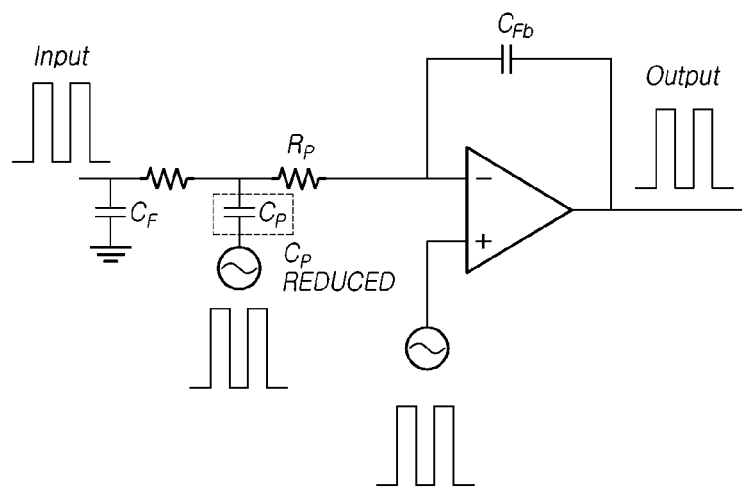
FIG. 11 illustrates an example of a driving method which may reduce influence due to a parasitic capacitance when the touch display device according to the exemplary embodiments performs touch sensing.

FIG. 11 illustrates a driving method of the touch display device 100 according to the present exemplary embodiments which performs the touch sensing while reducing the parasitic capacitance in the display panel 110. FIG. 11 includes similar components as described above with respect to FIG. 10.

Referring to FIG. 11, the touch display device 100 according to the present exemplary embodiments outputs a touch driving signal to a Tx electrode and an Rx electrode during a first touch sensing time period when the touch is sensed by the self capacitive sensing manner.

Here, the touch display device 100 modulates a ground signal which is applied to the display panel 110 into a signal having the same phase and voltage as those of the touch driving signal and applies the modulated ground signal to the display panel 110.

That is, during the first touch sensing time period when the touch sensing is performed by the self capacitive sensing manner, the touch display device 100 outputs the touch driving signal to the touch sensor TS and applies the ground signal which is modulated to be the same as the touch driving signal to the display panel 110, simultaneously.

Since the ground signal which is modulated to be the same as the touch driving signal is applied to the display panel 110, a signal applied to the electrode for display driving in the display panel 110 may have the same waveform as the touch driving signal.

Therefore, the magnitude of the parasitic capacitance formed between the touch sensor TS and an electrode for display driving in the display panel 110 is reduced and the magnitude of the parasitic capacitance is reduced so that the sensitivity of the touch sensing may be improved.

In this case, the signal for display driving may be applied to the display panel 110 during the first touch sensing time period and the signal for display driving may be applied during a time period which is different from the touch sensing time period. Here, the signal for display driving may refer to all signals which are applied to the display panel 110 during the display driving, such as a scan signal and a data voltage.

Further, when the touch sensing and the display driving are simultaneously performed, the touch driving signal output during the touch sensing time period may be synchronized with the display driving signal to be output. That is, the touch driving signal is synchronized with a synchronization signal (for example, Vsync/Hsync) output for display driving and is output, so that the touch sensing and the display driving may be performed during the same time period.

Figure 12:
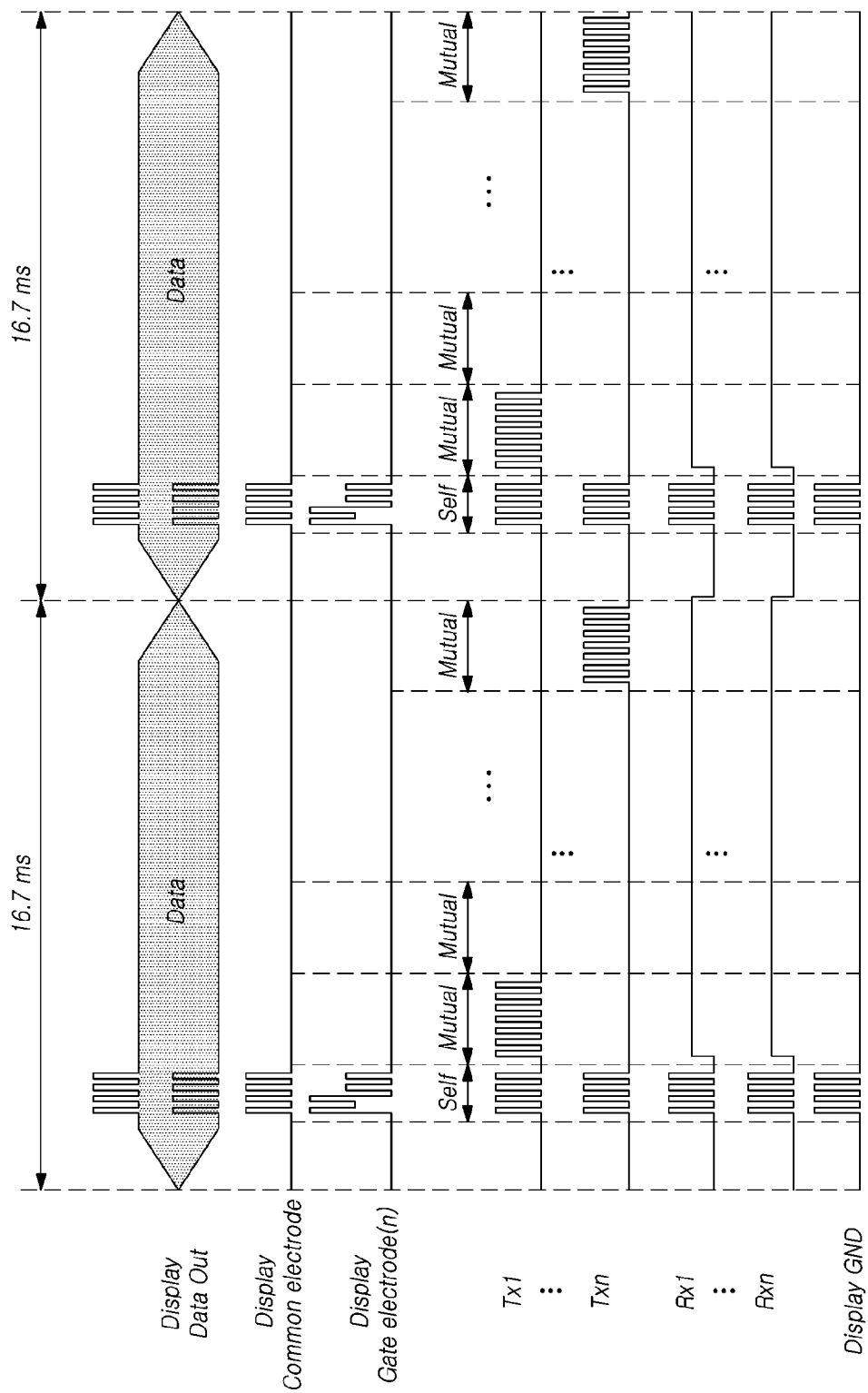
FIGS. 12 to 14 illustrate an example of a signal timing in a driving method which may reduce influence due to a parasitic capacitance when the touch display device according to the exemplary embodiments performs touch sensing.

FIG. 12 illustrates an example of a signal timing which is output during a time period when the touch display device 100 according to the present exemplary embodiments performs the touch sensing.

Referring to FIG. 12, the driving circuit 120 of the touch display device 100 according to the present exemplary embodiments outputs the touch driving signal to the Tx electrode and the Rx electrode during the first touch sensing time period of the touch sensing time period.

Simultaneously, the driving circuit 120 outputs a ground signal which is modulated to be the same as the touch driving signal to the display panel 110.

FIG. 12 illustrates an example that the display driving is simultaneously performed during the first touch sensing time period. As the ground signal which is modulated to be the same as touch driving signal is applied to the display panel 110, a scan signal and a data voltage which are applied to the display panel 110 have the same waveform as the touch driving signal by the ground signal.

Therefore, a parasitic capacitance with the touch sensor TS to which the touch driving signal is applied may be reduced.

Further, the display driving may be performed by time-divisional from the touch sensing. Even when the display driving is time-divisionally performed, the ground signal which is modulated to be the same as the touch driving signal is applied to the display panel 110, to improve the sensitivity of the touch sensing.

The driving circuit 120 of the touch display device 100 outputs the touch driving signal to the Tx electrode and receives the touch sensing signal from the Rx electrode during the second touch sensing time period when the touch sensing is performed by the mutual capacitive sensing manner.

In this case, the ground signal corresponding to a reference voltage is applied to the display panel 110.

Therefore, when the touch sensing is performed by using both the self capacitive sensing manner and the mutual capacitive sensing manner in parallel, the ground signal which is modulated to be the same as the touch driving signal is applied to the display panel 110 during the time period when the touch sensing is performed by the self capacitive sensing manner, so that the touch may be sensed while reducing the parasitic capacitance of the display panel 110.

Further, the touch display device 100 according to the present exemplary embodiments may perform the touch sensing only using the self capacitive sensing manner. In this case, the ground signal which is modulated to be the same as the touch driving signal is applied to the display panel 110 during all time periods where the touch sensing is performed.

In the meantime, the touch display device 100 according to the present exemplary embodiments outputs a modulated ground signal during the first touch sensing time period and outputs a ground signal corresponding to a reference voltage during the second touch sensing time period, so that an abnormality of a signal level may be caused during a predetermined time period at a time when the modulation of the ground signal is on/off.

The touch display device 100 according to the present exemplary embodiments may provide a method for suppressing the abnormality of the signal level at a timing when the modulation of the ground signal is on/off.

Figure 13:
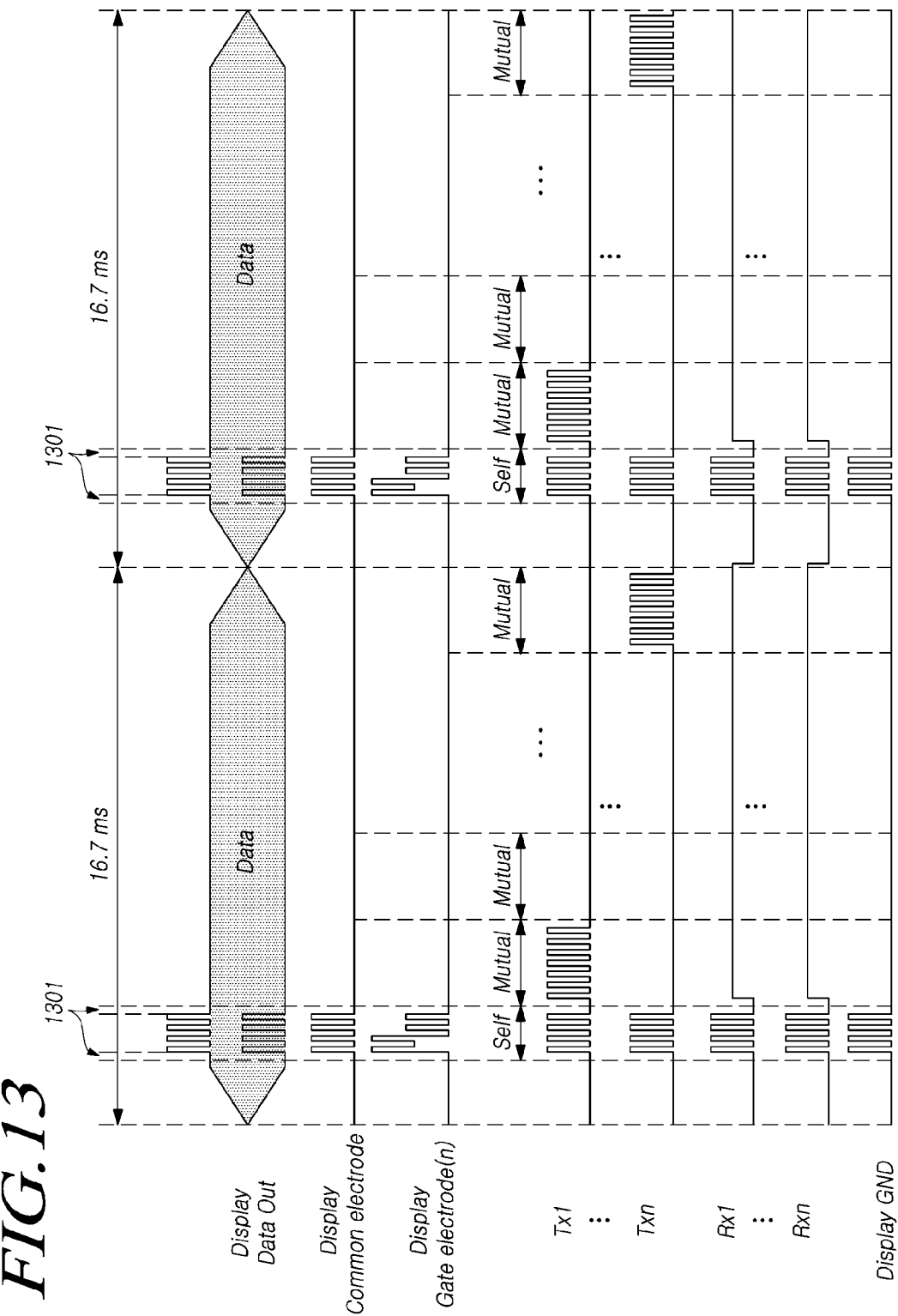

FIG. 13 illustrates another example of a signal timing which is output during a time period when the touch display device 100 according to the present exemplary embodiments performs the touch sensing.

Referring to FIG. 13, the driving circuit 120 of the touch display device 100 according to the present exemplary embodiments outputs the touch driving signal to the Tx electrode and the Rx electrode during a first sensing time period among the touch sensing time period.

Simultaneously, the driving circuit 120 outputs a ground signal which is modulated to be the same as the touch driving signal to the display panel 110.

The driving circuit 120 outputs the touch driving signal to the Tx electrode and receives the touch sensing signal from the Rx electrode during the second sensing time period. Further, the ground signal corresponding to a reference voltage is output to the display panel 110.

Therefore, a signal abnormality may be caused during a partial initial time period of the first touch sensing time period when the modulation of the ground signal is on and a partial last time period of the first touch sensing time period when the modulation of the ground signal is off.

In order to suppress the signal abnormality due to the on/off of the ground signal modulation, the touch display device 100 according to the present exemplary embodiments performs the display driving using a display driving signal which is output during a time period excluding the partial initial time period and the partial last time period of the first touch sensing time period.

That is, the display driving signal output during the partial initial time period and the partial last time period of the first touch sensing time period like a portion denoted by 1301 in FIG. 13 is ignored and the display driving signal output during the remaining time period is used to perform the display driving.

The display driving signal output during a partial time period including a timing at which the modulation of the ground signal is on/off is ignored so that it is possible to suppress the signal abnormality which may be generated as the modulation of the ground signal is performed only during the first touch sensing time period.

Alternatively, the display driving signal may not be output during the first touch sensing time period.

Figure 14:
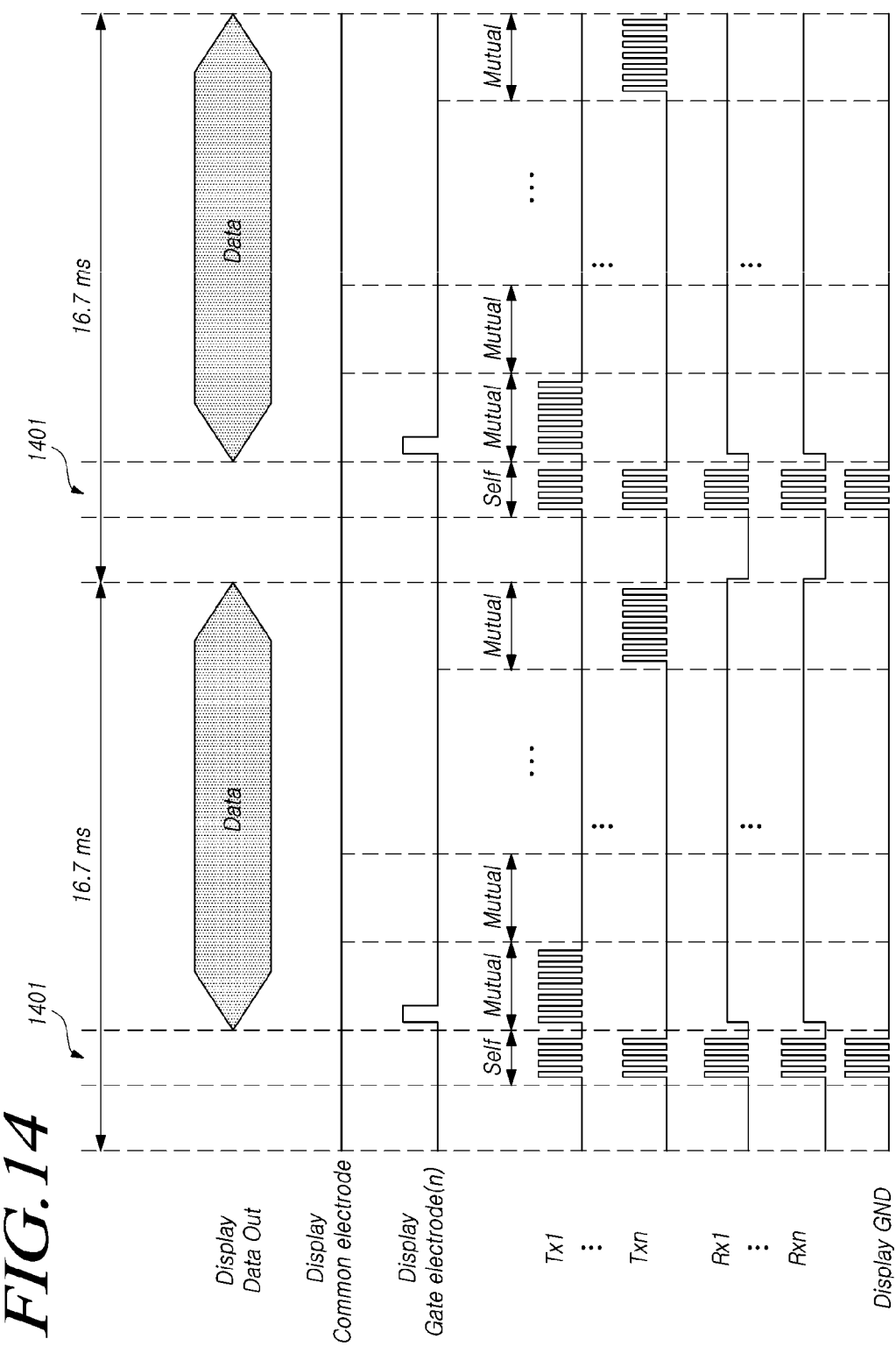

FIG. 14 illustrates another example of a signal timing which is output during a time period when the touch display device 100 according to the present exemplary embodiments performs the touch sensing.

Referring to FIG. 14, the driving circuit 120 of the touch display device 100 according to the present exemplary embodiments outputs the touch driving signal to the Tx electrode and the Rx electrode during the first touch sensing time period of the touch sensing time period.

In this case, as denoted by 1401 in FIG. 14, the driving circuit 120 may not output a display driving signal to the display panel 110 during the first touch sensing time period.

That is, the driving circuit 120 outputs a display driving signal to the display panel 110 during the time period which is the same as the touch sensing time period and may output the display driving signal only during the second touch sensing time period. Further, the driving circuit 120 does not output the display driving signal during the first touch sensing time period.

Further, even though an example that outputs the ground signal which is modulated to be the same as the touch driving signal during the first touch sensing time period, but does not output the display driving signal has been illustrated in FIG. 14, all signals which are output for display driving including the ground signal may be off.

Therefore, it is possible to suppress the display driving from being affected due to the signal abnormality during the first touch sensing time period including a timing at which the modulation of the ground signal is on/off.

Hereinafter, a method for performing touch sensing during the first touch sensing time period when the ground signal modulated to be the same as the touch driving signal is output will be described.

Figure 15:
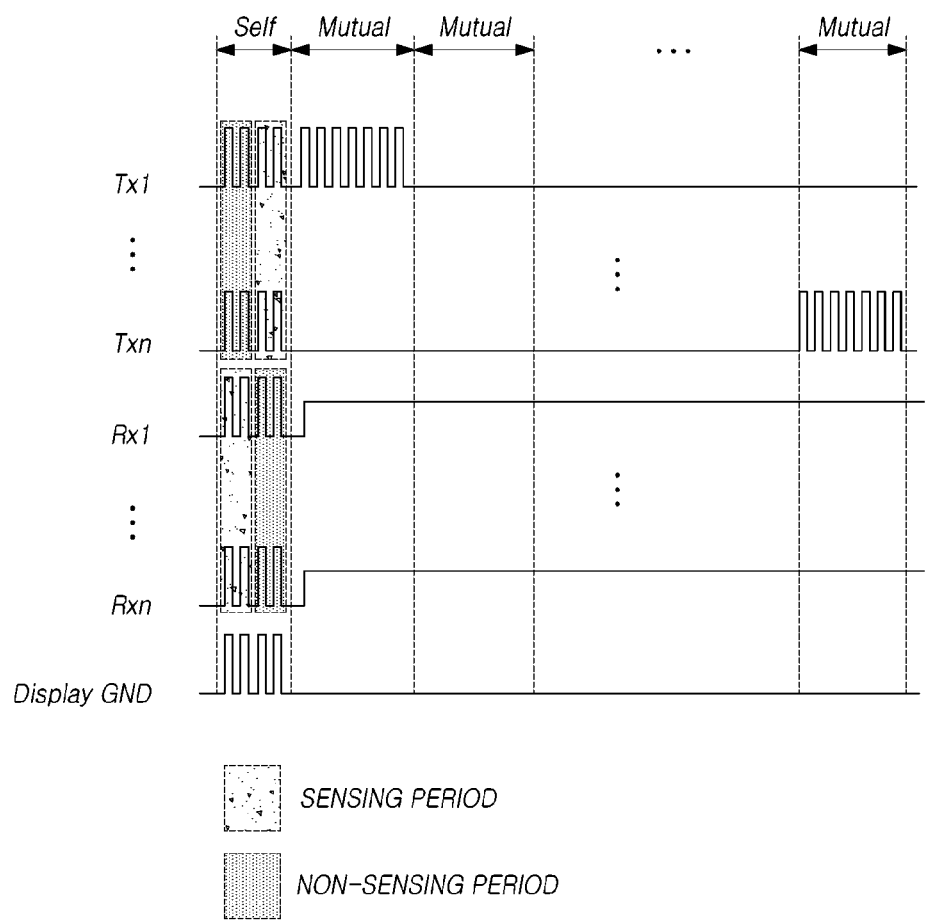
FIG. 15 is a view illustrating an example that the touch display device according to the exemplary embodiments performs touch sensing while reducing the parasitic capacitance.
Figure 16:
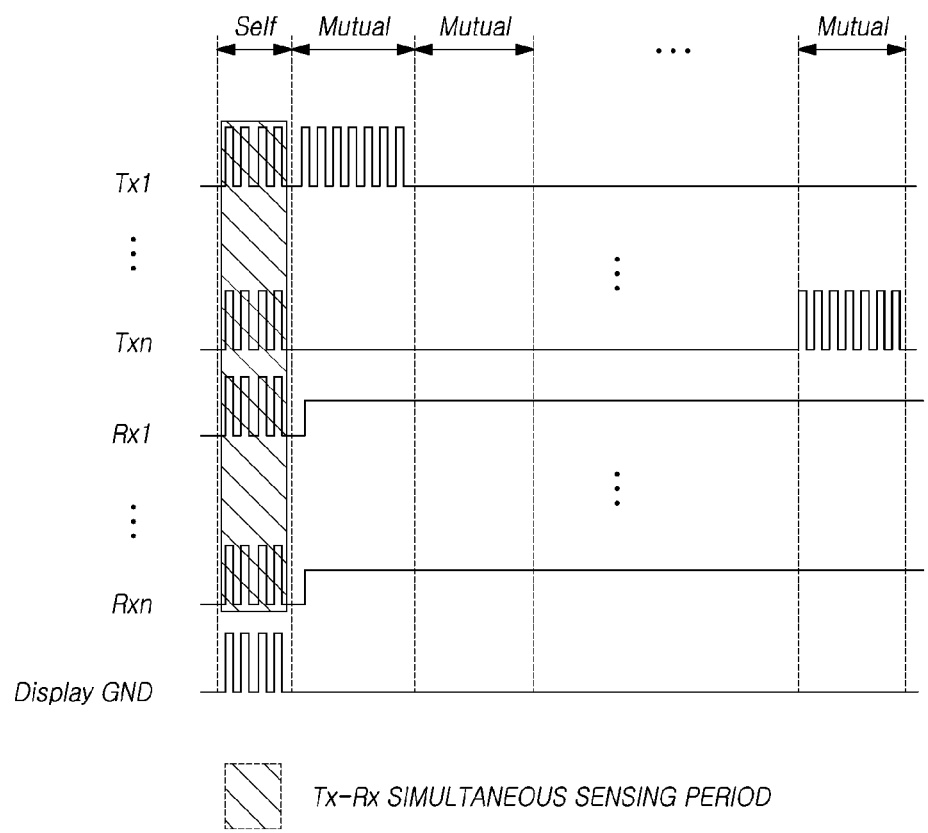
FIG. 16 is a view illustrating another example that the touch display device according to the exemplary embodiments performs touch sensing while reducing the parasitic capacitance.

FIGS. 15 and 16 illustrate an example of a method for performing touch sensing during the time period when the touch display device 100 according to the present exemplary embodiments senses the touch by the self capacitive sensing manner.

FIG. 15 illustrates an example that the driving circuit 120 of the touch display device 100 sequentially performs the touch sensing through the Tx electrode and the Rx electrode.

Referring to FIG. 15, the driving circuit 120 of the touch display device 100 outputs the touch driving signal to the Tx electrode and the Rx electrode during the first touch sensing time period when the touch sensing is performed by the self capacitive sensing manner.

Simultaneously, the driving circuit 120 outputs a ground signal which is modulated to be the same as the touch driving signal which is applied to the touch sensor TS to the display panel 110.

The driving circuit 120 receives the touch sensing signal from the Rx electrode and performs the touch sensing, during the first touch sensing time period. Further, the driving circuit 120 receives the touch sensing signal from the Tx electrode and performs the touch sensing after performing the touch sensing through the Rx electrode.

Alternatively, the driving circuit 120 may perform the touch sensing through the Tx electrode first, and then perform the touch sensing through the Rx electrode.

Therefore, the touch sensing through the Tx electrode is not performed while performing the touch sensing by receiving the touch sensing signal from the Rx electrode. Therefore, the touch sensing through the Rx electrode is not performed while performing the touch sensing by receiving the touch sensing signal from the Tx electrode.

That is, the touch signal is simultaneously applied to the Tx electrode and the Rx electrode during the first touch sensing time period and the touch sensing may be sequentially performed through the Tx electrode and the Rx electrode.

Therefore, as the ground signal which is modulated to be the same as the touch driving signal is output, even though the touch driving signal is simultaneously output to the Tx electrode and the Rx electrode, the touch sensing may be sequentially performed, similarly to the related art.

FIG. 16 illustrates an example that the driving circuit 120 of the touch display device 100 simultaneously performs the touch sensing through the Tx electrode and the Rx electrode.

Referring to FIG. 16, the driving circuit 120 of the touch display device 100 simultaneously outputs the touch driving signal to the Tx electrode and the Rx electrode during the first touch sensing time period when the touch sensing is performed by the self capacitive sensing manner.

Simultaneously, the driving circuit 120 outputs a ground signal which is modulated to be the same as the touch driving signal which is applied to the touch sensor TS to the display panel 110.

The driving circuit 120 simultaneously receives the touch sensing signal from the Tx electrode and the Rx electrode and performs the touch sensing.

Therefore, according to the present exemplary embodiment, as the ground signal modulated to be the same as the touch driving signal is applied to the display panel 110 during a time period when the touch is sensed by the self capacitive sensing manner, the touch driving signal is simultaneously output to the Tx electrode and the Rx electrode, so that the touch sensing through the Tx electrode and the Rx electrode may be simultaneously performed.

Figure 17:
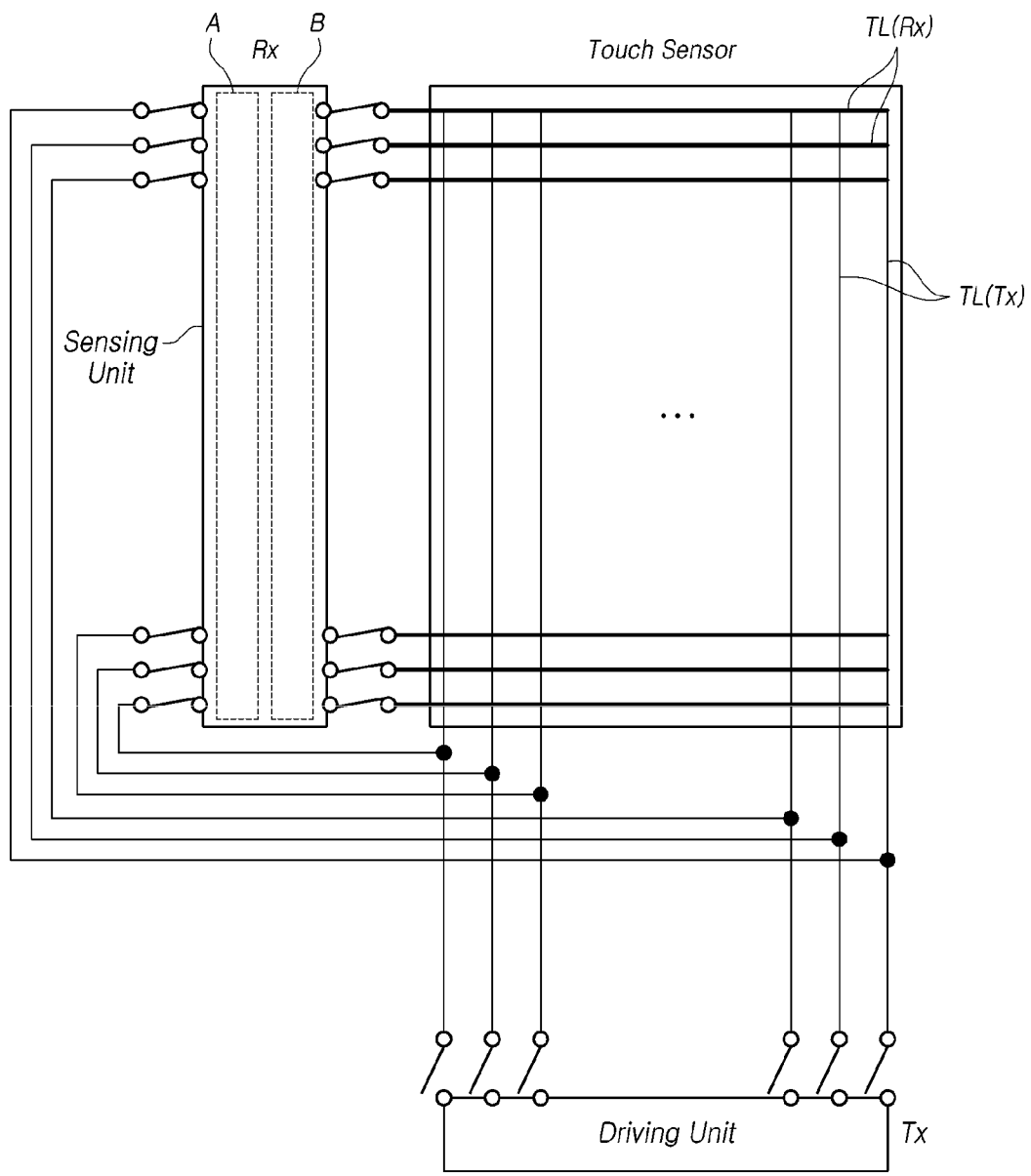
FIG. 17 is a view for explaining a manner in which a touch display device according to the present exemplary embodiments operates in a self capacitive sensing manner.

Referring to FIG. 17, in the touch display device 100 according to the present exemplary embodiment, a plurality of touch sensors TS configured by the Tx electrode and the Rx electrode is disposed in the touch display panel 110. As shown in FIG. 17, the sensing unit comprises a sensing unit A and a sensing unit B.

During a time period when the touch display device 100 according to the present exemplary embodiments performs touch sensing in the self capacitive sensing manner, as illustrated in FIGS. 15 and 16, a switch between first touch line TL(Tx) connected to the Tx electrode and a switch between the second touch line TL(Rx) connected to the Rx electrode is turned on so that the sensing unit receives the touch sensing signal. Sensing unit A and sensing unit B can sense the touch sensing signal from the first touch line TL(Tx) and the second touch line TL(Rx) sequentialy (e.g., FIG. 15) or simultaneously (e.g., FIG. 16).

Figure 18:
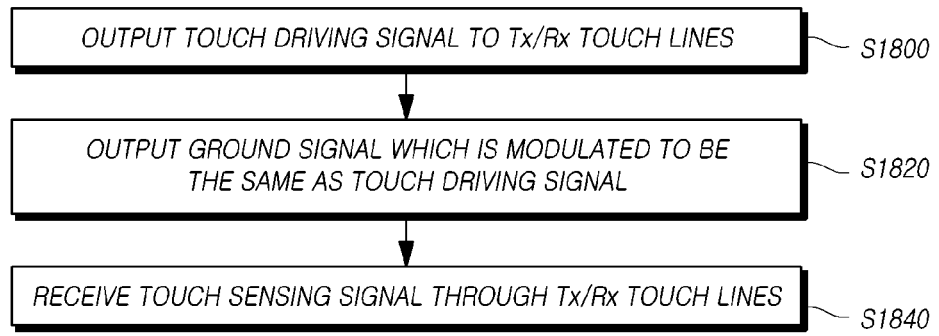
FIG. 18 is a view illustrating a process of a driving method of a touch display device according to the present exemplary embodiments.

FIG. 18 illustrates a driving method of a touch display device 100 according to the present exemplary embodiments.

Referring to FIG. 18, a driving circuit 120 of a touch display device 100 according to the present exemplary embodiments simultaneously outputs a touch driving signal to a first touch line TL(Tx) connected to a Tx electrode and a second touch line TL(Rx) connected to a Rx electrode during a time period when the touch is sensed by a self capacitive sensing manner (S1700).

The driving circuit 120 outputs a ground signal which is modulated to be the same as the touch driving signal to the display panel 110 during a time period when the touch is sensed (S1720).

In this case, the driving circuit 120 may output a signal for display driving of the display panel 110 during a touch sensing time period or during a time period which is time-divided from the touch sensing time period.

The driving circuit 120 receives the touch sensing signal from the Tx electrode and the Rx electrode (S1740) and senses the touch on the display panel 110 using the received touch sensing signal.

Here, the driving circuit 120 may sequentially or simultaneously perform the touch sensing through the Tx electrode and the Rx electrode.

Accordingly, according to the present exemplary embodiments, touch on the display panel 110 may be sensed by controlling switching between the touch lines TL connected to the touch sensor TS and the driving circuit 120, using both the self capacitive sensing manner and the mutual capacitive sensing manner in parallel.

By doing this, various touch functions such as multi touch may be provided while improving sensitivity of the touch sensing.

Further, the ground signal which is modulated to be the same as the touch driving signal is output to the display panel 110 during a time period when the touch sensing is performed by the self capacitive sensing manner, so that parasitic capacitance of the display panel 110 is reduced, thereby improving sensitivity of the touch sensing.

It will be appreciated that various exemplary embodiments of the present disclosure have been described herein for purposes of illustration, and that various modifications, changes, and substitutions may be made by those skilled in the art without departing from the scope and spirit of the present disclosure. Further, the exemplary embodiments disclosed herein are intended to not limit but describe the technical spirit of the present disclosure and the scope of the technical spirit of the present disclosure is not restricted by the exemplary embodiments. The protection scope of the present disclosure should be interpreted based on the following appended claims and it should be appreciated that all technical spirits included within a range equivalent thereto are included in the protection scope of the present disclosure.

What is claimed is:

1. A touch display device comprising:
   a first plurality of touch sensors disposed on a display panel along a first direction;
   a plurality of first touch lines electrically connected to the first plurality of touch sensors;
   a second plurality of touch sensors disposed on the display panel along a second direction that intersects the first direction;
   a plurality of second touch lines electrically connected to the second plurality of touch sensors; and
   a driving circuit configured to output a touch driving signal for sensing touch on the touch display device to at least one of the first plurality of touch sensors via at least one of the plurality of first touch lines or at least one of the second plurality of touch sensors via at least one of the plurality of second touch lines, and receive a touch sensing signal through the at least one of the plurality of first touch lines or the at least one of the plurality of second touch lines during a touch sensing time period, and output a ground signal to the display panel while the touch driving signal is output to the at least one of the first plurality of touch sensors and the at least one of the second plurality of touch sensors,
   wherein the driving circuit is configured to output the touch driving signal to a first touch line of the at least one of the plurality of first touch lines and a second touch line of the at least one of the plurality of second touch lines, and receive the touch sensing signal through the first touch line and the second touch line during a first touch sensing time period of the touch sensing time period for self-capacitive touch sensing,
   wherein the driving circuit is configured to output the touch driving signal to the first touch line and receive the touch sensing signal through the second touch line during a second touch sensing time period for mutual capacitive touch sensing,
   wherein the ground signal has a first ground signal during the first touch sensing time period and a second ground signal during the second touch sensing time period, and
   wherein the first ground signal has the same phase as the touch driving signal, and the second ground signal has a constant voltage corresponding to a reference voltage to the display panel.

2. The touch display device according to claim 1, wherein the driving circuit outputs a display driving signal for displaying an image to the display panel during the first touch sensing time period.

3. The touch display device according to claim 1, wherein the driving circuit outputs the touch driving signal to be synchronized with a display driving signal that is output to the display panel to display an image on the display panel.

4. The touch display device according to claim 1, further comprising:
   an organic light emitting layer disposed on the display panel; and
   an encapsulation layer disposed on the organic light emitting layer, wherein the plurality of first touch sensors and the plurality of second touch sensors are metal disposed on the encapsulation layer.

5. The touch display device according to claim 1, further comprising:
an organic light emitting layer disposed on the display panel; and
an encapsulation layer disposed on the organic light emitting layer,
wherein the plurality of first touch sensors and the plurality of second touch sensors are film touch sensors that are adhered onto the encapsulation layer through an adhesive film.

6. A driving method of a touch display device, comprising:
outputting a touch driving signal to at least one touch line of a first touch line and a second touch line disposed on a display panel during a touch sensing time period for sensing touch on the touch display device;
outputting a ground signal to the display panel with the touch driving signal during the touch sensing time period;
receiving a touch sensing signal through at least one touch line among the first touch line and the second touch line; and
sensing touch on the display panel based on the received touch sensing signal,
wherein the touch sensing time period includes a first touch sensing time period and a second touch sensing time period,
wherein the ground signal has a first ground signal and a second ground signal,
wherein during the first touch sensing time period, the touch driving signal is output to the first touch line and the second touch line, and the touch sensing signal is received through the first touch line and the second touch line,
wherein during the second touch sensing time period, the touch driving signal is output to the first touch line but not to the second touch line, and the touch sensing signal is received through the second touch line but not through the first touch line, and
wherein the driving method further comprising; outputting the first ground signal having the same phase as the touch driving signal during the first touch sensing time period, and
outputting the second ground signal having a constant voltage corresponding to a reference voltage to the display panel during the second touch sensing time period.

7. The driving method according to claim 6, further comprising:
outputting a display driving signal for displaying an image to the display panel during the first touch sensing time period.

8. A touch display device, comprising:
a first plurality of touch sensors disposed on a display panel along a first direction;
a plurality of first touch lines electrically connected to the first plurality of touch sensors;
a second plurality of touch sensors disposed on the display panel along a second direction that intersects the first direction;
a plurality of second touch lines, the plurality of second touch lines electrically connected to the second plurality of touch sensors; and a driving circuit configured to output the touch driving signal to a first touch line of the plurality of first touch lines and a second touch line of the plurality of second touch lines during a first touch sensing time period for self-capacitive touch sensing, and receives the touch sensing signal through the first touch line and the second touch line during the first touch sensing time period, and outputs the touch driving signal to the first touch line during a second touch sensing time period for mutual capacitive touch sensing and receives the touch sensing signal through the second touch line during the second touch sensing time period, and
the driving circuit outputting a ground signal to a ground line of the display panel,
wherein the driving circuit outputs the first ground signal having the same phase as the touch driving signal during the first touch sensing time period and the second ground signal having a constant voltage corresponding to a reference voltage to the display panel during the second touch sensing time period.

9. The touch display device according to claim 8, further comprising:
an encapsulation layer disposed on the ground line.

10. The touch display device according to claim 8, wherein the touch driving signal is output to the first touch line and the second touch line during the first touch sensing time period of a display frame period, and wherein the touch driving signal is output to the first touch line during the second touch sensing time period of the same display frame period.

11. The touch display device according to claim 8, wherein the driving circuit outputs a display driving signal for displaying an image to the display panel during the first touch sensing time period.

12. A touch display device, comprising:
a first plurality of touch sensors disposed on a display panel along a first direction;
a plurality of first touch lines electrically connected to the first plurality of touch sensors;
a second plurality of touch sensors disposed on the display panel along a second direction that intersects the first direction;
a plurality of second touch lines, the plurality of second touch lines electrically connected to the second plurality of touch sensors; and
a driving circuit configured to output a touch driving signal for sensing touch via either self- capacitive touch sensing or mutual capacitive touch sensing during a plurality of touch sensing periods in a single display frame, the touch driving signal output to at least one of the first plurality of touch sensors and the second plurality of touch sensors, and outputs a ground signal to the display panel while the touch driving signal is output to at least one of the first plurality of touch sensors or at least one of the second plurality of touch sensors,
wherein the driving circuit outputs the touch driving signal to a first touch line of the plurality of first touch lines and a second touch line of the plurality of second touch lines, and receives a touch sensing signal through the first touch line and the second touch line during a first touch sensing time period of a touch sensing time period for the self-capacitive touch sensing, and outputs the touch driving signal to the first touch line and receives the touch sensing signal through the second touch line during a second touch sensing time period for mutual capacitive touch sensing, wherein the ground signal has a first ground signal and a second ground signal, and wherein the driving circuit outputs the first ground signal having the same phase as the touch driving signal during the first touch sensing time period and the second ground signal having a constant voltage corresponding to a reference voltage to the display panel during the second touch sensing time period.

* * * * *